Figure 1:
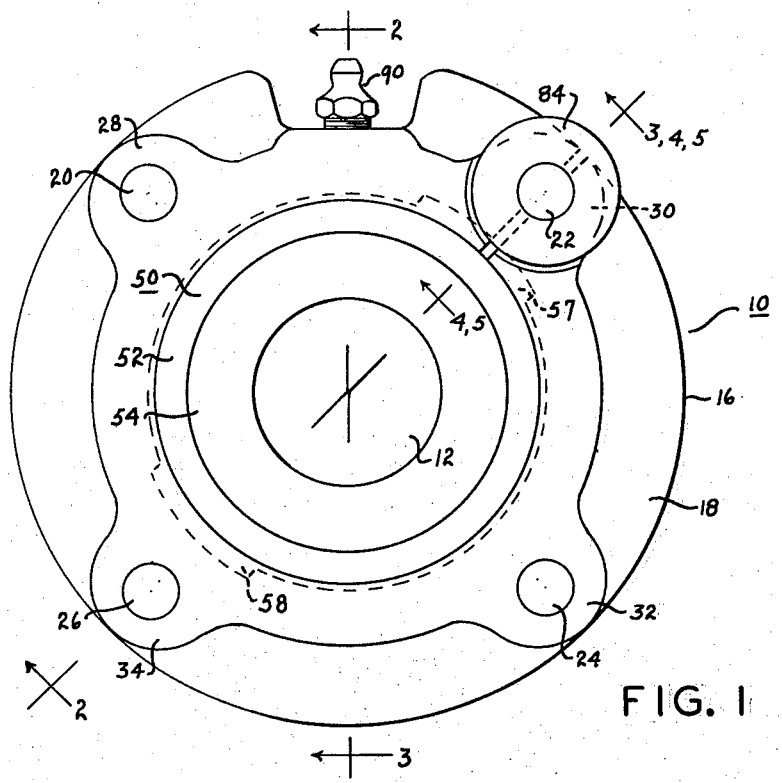
Figure 2:
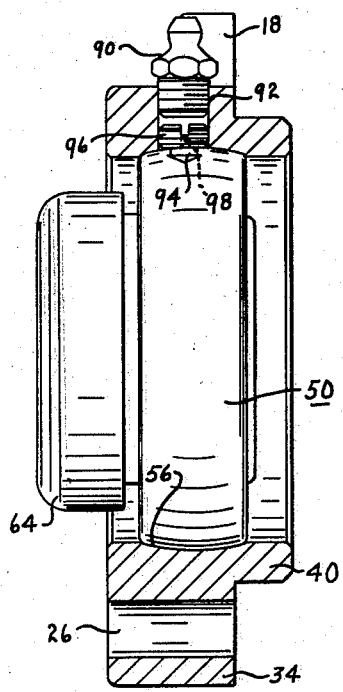

June 8, 1965 D. FIRTH 3,188,154
SHAFT BEARING
Filed Jan. 24, 1963 2 Sheets-Sheet 1

INVENTOR.
DAVID FIRTH
BY *Hobbs & Easton*
ATTORNEYS

June 8, 1965 D. FIRTH 3,188,154
SHAFT BEARING
Filed Jan. 24, 1963 2 Sheets-Sheet 2
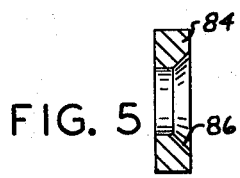
FIG. 5
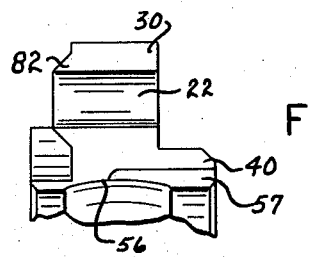
FIG. 4
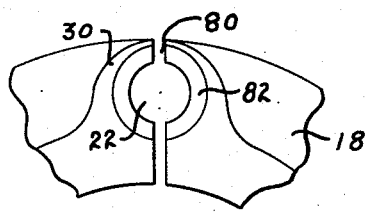
FIG. 6
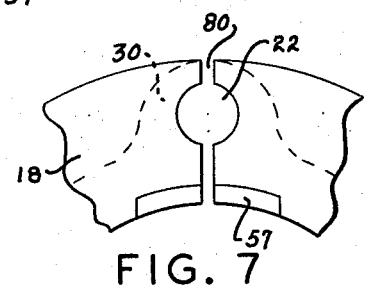
FIG. 7
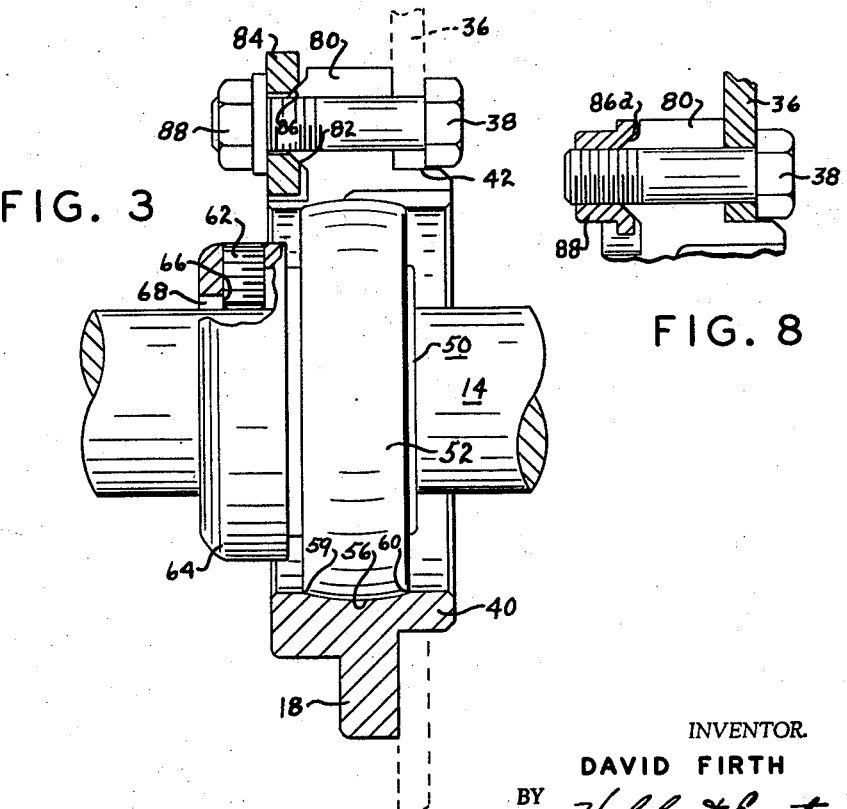
FIG. 3
FIG. 8
INVENTOR.
DAVID FIRTH
BY Hobbs & Easton
ATTORNEYS June 8, 1965  R. H. KEMNITZ  3,188,155
ALIGNMENT INDICATING ROLLER TYPE SUPPORT ASSEMBLY
Filed Jan. 24, 1963
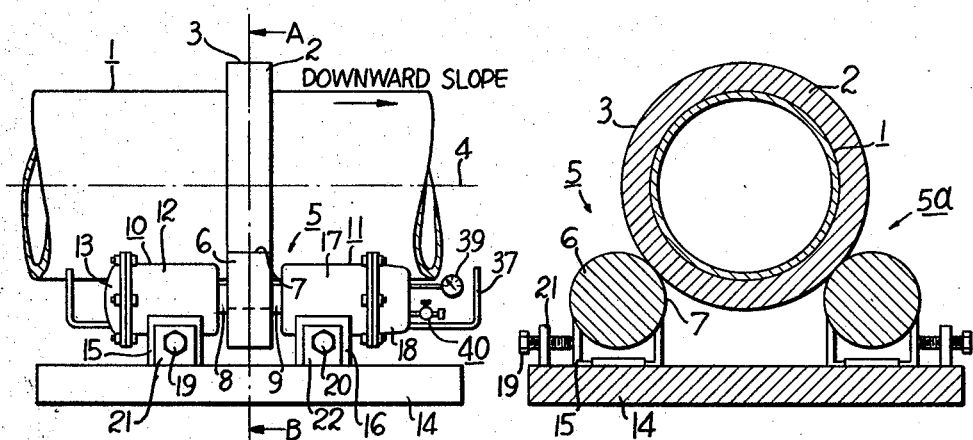
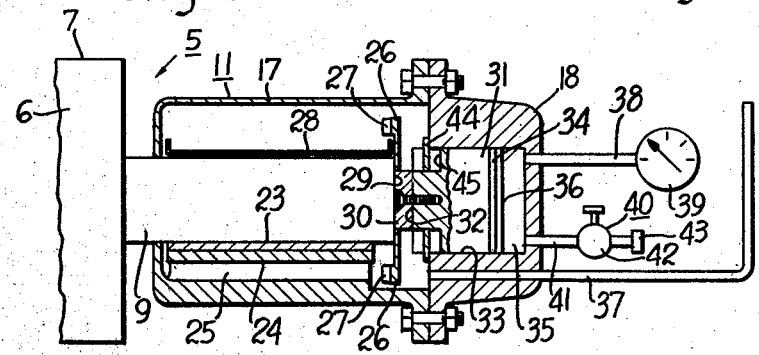
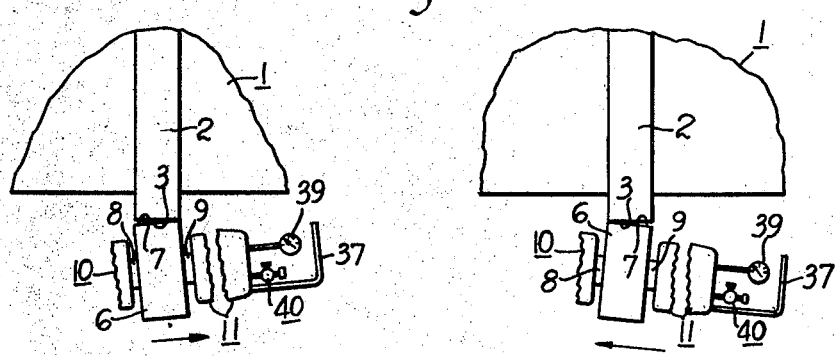
Inventor
Robert H. Kemnitz
By Arthur M. Strich
Attorney cal bore therein and having at least one slot at one edge of said bore, a bearing having a spherical outer race seated in said bore, a hole parallel with the center axis of said block extending through said housing, a radial slot extending through said housing at said hole, a conical projection around said hole, a washer with a conical recess therein for engaging said conical projection, and a bolt means extending through said hole for urging said washer and projection together to draw the segments of said housing on opposite sides of said radial slot together.

6. A pillow block comprising a housing having opposed slots at one edge of said bore, a bearing having a spherical outer race seated in said bore, a hole parallel with the center axis of said block extending through said housing, a radial slot extending through said housing at said hole, a tapered portion on opposite sides of said slot extending peripherally and inwardly from said slot, a member having a tapered recess for engaging said tapered portions, and a bolt means extending through said hole for urging said member and tapered portions together to draw the segments of said housing on opposite sides of said slot together.

7. A pillow block comprising a one piece housing having a center opening therethrough and opposed slots at one edge of said bore, a plurality of bosses with holes therethrough spaced around the periphery of said housing, an annular groove of arcuate cross section in the internal wall of said housing, the radii of said groove and said arcuate cross section being the same length and having the same center, a bearing seated in said groove and having an outer race with the same external surface curvature as said groove, a radial slot extending through said housing at one of said holes, a tapered portion on opposite sides of said slot extending peripherally and inwardly from said slot, a member having a tapered recess for engaging said tapered portions, and a bolt with a nut extending through said last mentioned hole for urging said member and tapered portions together to draw the segments of said housing on opposite sides of said slot toward one another and thereby reduce the diameter of said groove.

8. A flange type pillow block, comprising a one piece housing having a center opening therethrough and having at least one slot at one edge of said bore, a flange having a plurality of spaced bosses with holes therethrough, an annular groove of arcuate cross section in the internal wall of said housing, the radii of said groove and said arcuate cross section being the same length and having the same center, a ball bearing seated in said groove having an outer race with the same external surface curvature as said groove, a radial slot extending through said housing at one of said holes, a conical projection around said last mentioned hole, a washer with a conical recess therein for engaging said conical projection, and a bolt extending through said last mentioned hole for urging said washer and projection together to draw the segments of said housing on opposite sides of said radial slot toward one another and thereby reduce the diameter of said groove.

9. A flange type pillow block, comprising a one piece housing having a spherical bore therein, a bearing having a spherical outer race seated in said bore, said housing having a slot in the edge of said bore for receiving said bearing in a position transverse to the axis of said bore, a radial slot extending through said housing, and means engaging the segments on opposite sides of said radial slot for drawing said segments toward one another and thereby reduce the diameter of said bore.

10. A flange type pillow block, comprising a one piece housing with a center opening therethrough and a plurality of bosses with holes therethrough spaced around the periphery of said housing, an annular groove of arcuate cross section in the internal wall of said housing, the radii of said groove and said arcuate cross section being the same length and having the same center, a bearing seated in said groove and having an outer race with the same external surface curvature as said groove, said housing having a slot in the edge of said bore for receiving said bearing in a position transverse to the axis of said bore, a radial slot extending through said housing at one of said holes, and means engaging the segments on opposite sides of said radial slot for urging said segments toward one another.

11. A pillow block comprising a housing with a spherical bore therein, a bearing having a spherical periphery seated in said bore, said housing having a slot in the edge of said bore for receiving said bearing in a position transverse to the axis of said bore, a hole through the housing, a slot extending through the housing at said hole, a conical projection around said hole, and a bolt means including a nut and extending through said hole and having a conical recess for engaging said conical projection for drawing the segments of said housing on opposite sides of said last mentioned slot together.

References Cited by the Examiner

UNITED STATES PATENTS

| | | | |
|---|---|---|---|
| 1,778,391 | 10/30 | Kendall | 308—194 XR |
| 1,921,629 | 8/33 | McKee. | |
| 2,819,128 | 1/58 | Downs | 308—194 |
| 2,820,651 | 1/58 | Phillips | 85—9 XR |
| 3,001,841 | 9/61 | Glavan | 308—72 XR |

FOREIGN PATENTS

| | | |
|---|---|---|
| 153,441 | 5/38 | Austria. |
| 1,229,079 | 3/60 | France. |

FRANK SUSKO, *Primary Examiner.*